(12) United States Patent
Vipat et al.

(10) Patent No.: US 9,454,676 B2
(45) Date of Patent: Sep. 27, 2016

(54) TECHNOLOGIES FOR PREVENTING HOOK-SKIPPING ATTACKS USING PROCESSOR VIRTUALIZATION FEATURES

(71) Applicant: Intel Corporation, Santa Clara, CA (US)

(72) Inventors: Harshawardhan Vipat, San Jose, CA (US); Manohar R. Castelino, Santa Clara, CA (US); Ravi L. Sahita, Beaverton, OR (US); Sergio Rodriguez, San Lorenzo, CA (US); Vikas Gupta, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 34 days.

(21) Appl. No.: 14/318,215

(22) Filed: Jun. 27, 2014

(65) Prior Publication Data

US 2015/0379263 A1 Dec. 31, 2015

(51) Int. Cl.
*G06F 11/00* (2006.01)
*G06F 12/14* (2006.01)
*G06F 12/16* (2006.01)
*G08B 23/00* (2006.01)
*G06F 21/79* (2013.01)
*G06F 21/62* (2013.01)

(52) U.S. Cl.
CPC ............... *G06F 21/79* (2013.01); *G06F 21/62* (2013.01)

(58) Field of Classification Search
CPC .................................. G06F 21/56; G06F 21/79
USPC .......................................................... 726/23
See application file for complete search history.

(56) References Cited

U.S. PATENT DOCUMENTS

| 5,604,887 | A | * | 2/1997 | Naidu | G06F 3/0622 703/27 |
| 2007/0043943 | A1 | * | 2/2007 | Peretti | H04L 63/10 713/167 |
| 2010/0241875 | A1 | * | 9/2010 | Ishii | G06F 3/062 713/193 |
| 2013/0275701 | A1 | * | 10/2013 | Symes | G06F 12/145 711/163 |
| 2014/0189194 | A1 | * | 7/2014 | Sahita | G06F 12/1009 711/6 |
| 2014/0380009 | A1 | * | 12/2014 | Lemay | G06F 12/145 711/163 |

* cited by examiner

*Primary Examiner* — Dant Shaifer Harriman
(74) *Attorney, Agent, or Firm* — Barnes & Thornburg LLP

(57) ABSTRACT

Technologies for monitoring system API calls include a computing device with hardware virtualization support. The computing device establishes a default memory view and a security memory view to define physical memory maps and permissions. The computing device executes an application in the default memory view and executes a default inline hook in response to a call to an API function. The default inline hook switches to the security memory view using hardware support without causing a virtual machine exit. The security inline hook calls a security callback function to validate the API function call in the security memory view. Hook-skipping attacks may be prevented by padding the default inline hook with no-operation instructions, by designating memory pages of the API function as non-executable in the default memory view, or by designating memory pages of the application as non-executable in the security memory view. Other embodiments are described and claimed.

20 Claims, 8 Drawing Sheets

TECHNOLOGIES FOR PREVENTING HOOK-SKIPPING ATTACKS USING PROCESSOR VIRTUALIZATION FEATURES

BACKGROUND

Application software typically performs tasks by calling shared library functions provided by an operating system or other operating environment through one or more application programming interfaces (APIs). Similarly, malicious software ("malware") may call system APIs to cause crashes, copy protected data, or perform other malicious activities. Thus, security software may monitor system API calls to detect malware, mitigate damage caused by malware, and perform other security tasks. Security software may monitor API calls by installing one or more inline hooks on the system API. An inline hook is a segment of code that replaces a part of a system API function—typically the first few instructions of the system API function—causing the inline hook to be executed whenever the system API function is invoked. The inline hook may, in turn, redirect program execution to security software that may perform validation checks, remove malware, or perform other security checks. Typical inline hooks are installed within the virtual address space of an application process and thus may be easily overwritten or otherwise circumvented by malware. For example, hook-skipping attacks may simply jump to a location within the system API function that is located past the inline hook.

Typical computer processors include hardware support for virtualization features. Software virtualization includes transparently executing one or more guest operating systems from within a host operating system or VMM. Hardware virtualization features may include an extended privilege model, hardware-assisted support for virtual memory addressing, support for extended memory permissions, and other virtualization features.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
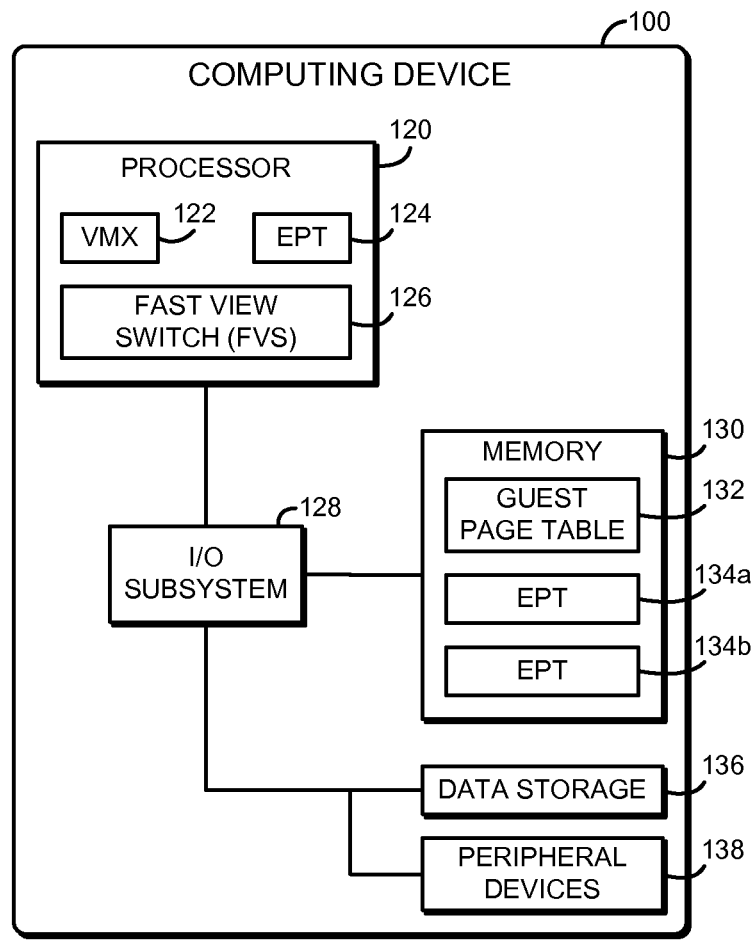
FIG. 1 is a simplified block diagram of at least one embodiment of a computing device for monitoring API function calls using inline hooks.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for monitoring API function calls includes a processor 120, an I/O subsystem 128, a memory 130, and a data storage device 136. In use, as described below, the computing device 100 is configured to support multiple views of memory using hardware-assisted extended page table support. In particular, the computing device 100 establishes a default, untrusted view and a trusted, security view. To monitor an API function, the computing device 100 installs two different inline hooks into the default view and the security view, respectively. The application executes in the default view. Upon invocation of the API function, the inline hook of the default memory view switches to the security view using a hardware-assisted fast view-switching instruction. No exit to a virtual machine monitor (VMM) is required to switch memory views. In the security memory view, the computing device 100 invokes a security function that may perform security checks or other security functions prior to executing the API function. After completing the security function, the computing device 100 switches back to the default view and returns to the calling application. Using the two different memory views allows the computing device 100 to prevent hook-skipping attacks, for example by enforcing restrictive memory permissions in the default memory view. By using fast view-switching instructions, the computing device 100 may monitor calls to the API function without incurring the overhead associated with switching to a VMM.

The computing device 100 may be embodied as any type of device capable of monitoring API function calls and otherwise performing the functions described herein. For example, the computing device 100 may be embodied as, without limitation, a laptop computer, a notebook computer, a tablet computer, a smartphone, a mobile computing device, a wearable computing device, a computer, a desktop computer, a workstation, a server computer, a distributed computing system, a multiprocessor system, a consumer electronic device, a smart appliance, and/or any other computing device capable of monitoring API function calls. As shown in FIG. 1, the illustrative computing device 100 includes the processor 120, the I/O subsystem 128, the memory 130, and the data storage device 136. Of course, the computing device 100 may include other or additional components, such as those commonly found in a tablet computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor may be embodied as a single or multi-core processor(s), digital signal processor, microcontroller, or other processor or processing/controlling circuit. The processor 120 includes hardware-based, hardware-assisted, or hardware-accelerated support for virtualization. In particular, the processor 120 includes virtual machine extensions (VMX) support 122, extended page table (EPT) support 124, and fast view switch (FVS) support 126. The VMX support 122 supports virtualized execution of operating systems by providing two modes of execution: VMX-root mode and VMX non-root mode. The VMX-root mode allows executing software to have broad control of the computing device 100 and its hardware resources. Conversely, a hypervisor, virtual machine monitor (VMM), or host operating system (OS) may execute in VMX-root mode. The VMX non-root mode restricts access to certain hardware instructions while still implementing the ordinary ring/privilege system of the processor 120. One or more guest OSs may execute in the VMX non-root mode. Those guest OSs may execute in ring zero, similar to being executed without virtualization. The execution of certain hardware instructions and certain other system events may trigger hardware-assisted transitions to VMX root mode. Those hardware-assisted transitions are known as virtual machine exits, or VMExits. Upon encountering a VMExit, the processor 120 may switch context from the guest OS to the VMM in order to handle the VMExit. Thus, VMExits may impose a performance penalty on virtualized code. The VMX support 122 may be embodied as, for example, Intel® VT-x technology.

The EPT support 124 supports hardware-assisted second-level page address translation. For nonvirtualized workloads (or when operating in VMX-root mode), the processor 120 may provide hardware-assisted translation between virtual memory addresses (also known as linear addresses) to physical memory addresses. The processor 120 may translate memory addresses using one or more page table structures stored in the memory 130 and managed by a host operating system, hypervisor, or VMM. For virtualized workloads (or when operating in VMX non-root mode), the processor 120 supports hardware-assisted translation between virtual memory addresses (used, for example, by applications executing within a guest OS) to guest-physical memory addresses. A guest OS may maintain one or more page table structures in the memory 130 to manage the translation to guest-physical memory addresses. However, a guest-physical memory address may not correspond to an actual physical memory address within the memory 130. The EPT support 124 provides hardware-assisted translation between guest-physical memory addresses to physical memory addresses. The EPT support 124 may translate memory addresses using one or more extended page table structures stored in the memory 130 and managed by the VMM, hypervisor, or host OS. Without the EPT support 124, translation between guest-physical memory addresses and physical memory addresses may require one or more VMExits. The EPT support 124 also supports associating access permissions with each guest physical page and/or physical page (e.g., read, write, and/or execute permissions). Permissions violations, which may be known as EPT violations, may generate VMExits that allow the host OS, hypervisor, or VMM to handle the EPT violation. Additionally or alternatively, in some embodiments, permissions violations may generate a virtualization exception that may be handled by a guest OS. The EPT support 124 may be embodied as, for example, Intel® VT-x technology.

The FVS support 126 allows the processor 120 to quickly and atomically switch between several memory views without requiring a VMExit to VMX-root mode. A memory view includes the guest-physical page mapping and associated permissions defined by an EPT and thus may correspond one-to-one with an EPT. The FVS support 126 may support switching memory views by changing a pointer within an in-memory virtual machine control structure (VMCS) to point to a different EPT structure. In some embodiments, the FVS support 126 may allow software in VMX non-root mode to select one of several memory views that have been predefined by software executing within the VMX-root mode. Accordingly, the FVS support 126 may allow a guest OS or software executing within the guest OS to switch between memory views without requiring a potentially expensive context switch to the VMM, hypervisor, or host OS. The FVS support 126 may be embodied as a specialized processor instruction such as the VMFUNC instruction supported by certain Intel® processors.

The memory 130 may be embodied as any type of volatile or non-volatile memory or data storage capable of performing the functions described herein. In operation, the memory 130 may store various data and software used during operation of the computing device 100 such operating systems, applications, programs, libraries, and drivers. The memory 130 may be subdivided into fixed-sized segments known as pages. Each page may include, for example, 4096 bytes of data. The memory further includes a guest page table 132 and one or more extended page tables (EPTs) 134. The guest page table 132 stores mappings between virtual memory pages and guest-physical memory pages. As described above, the guest page table 132 may be used by the processor 120 to translate between virtual memory addresses and guest-physical memory addresses. Each EPT 134 stores mappings between guest-physical memory pages and physical memory pages. As described above, each EPT 134 may be used by the EPT support 124 of the processor 120 to translate between guest-physical memory addresses and physical memory addresses. Each EPT 134 also includes access permissions (e.g., read, write, and/or execute) for each guest-physical page. The illustrative computing device 100 includes two EPTs 134a, 134b; however, in other embodiments the computing device 100 may establish more or fewer EPTs 134. Both the guest page table 132 and the EPTs 134 may be embodied as one or more in-memory data structures such as arrays, lists, associative arrays, nested or hierarchical arrays, or other data structures.

The memory 130 is communicatively coupled to the processor 120 via the I/O subsystem 128, which may be embodied as circuitry and/or components to facilitate input/output operations with the processor 120, the memory 130, and other components of the computing device 100. For example, the I/O subsystem 128 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 128 may form a portion of a system-on-a-chip (SoC) and be incorporated, along with the processor 120, the memory 130, and other components of the computing device 100, on a single integrated circuit chip.

The data storage device 136 may be embodied as any type of device or devices configured for short-term or long-term storage of data such as, for example, memory devices and circuits, memory cards, hard disk drives, solid-state drives, or other data storage devices. In some embodiments, the computing device 100 may also include one or more peripheral devices 138. The peripheral devices 138 may include any number of additional input/output devices, interface devices, and/or other peripheral devices. For example, in some embodiments, the peripheral devices 138 may include a display, touch screen, graphics circuitry, keyboard, mouse, speaker system, and/or other input/output devices, interface devices, and/or peripheral devices.

Figure 2:
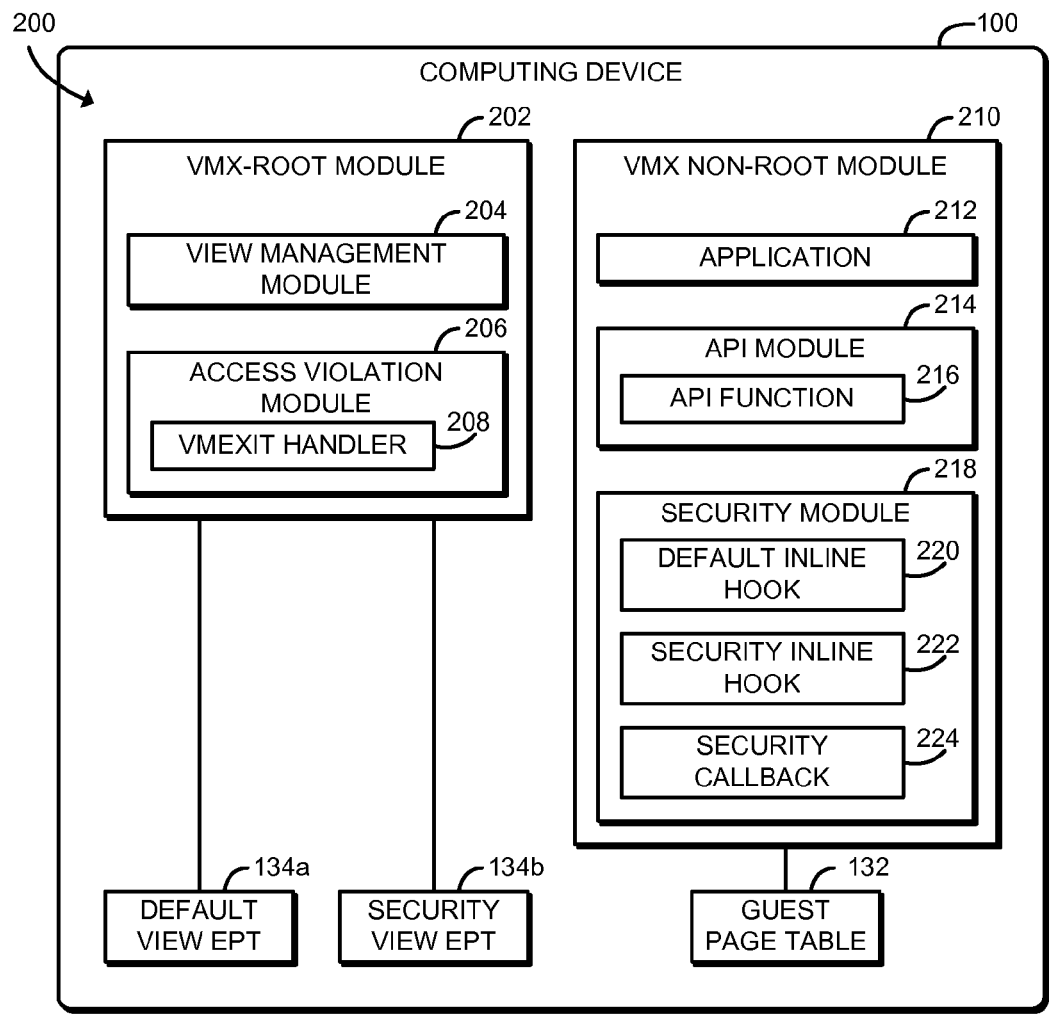
FIG. 2 is a simplified block diagram of at least one embodiment of an environment of the computing device of FIG. 1.

Referring now to FIG. 2, in the illustrative embodiment, the computing device 100 establishes an environment 200 during operation. The illustrative embodiment 200 includes a VMX-root module 202 and a VMX non-root module 210. The various modules of the environment 200 may be embodied as hardware, firmware, software, or a combination thereof.

The VMX-root module 202 is configured to execute in VMX-root mode using the VMX support 122 of the processor 120 and thereby manage the EPTs 134. In particular, the VMX-root module 202 is configured to manage an EPT 134a that defines the default memory view and an EPT 134b that defines the security memory view. The VMX-root module 202 may be embodied as a virtual machine monitor (VMM), a hypervisor, a host operating system (OS), or any other control structure of the computing device 100 that may execute in VMX-root mode. The VMX-root module 202 establishes a view management module 204 and an access violation module 206.

The view management module 204 is configured to manage the default view EPT 134a and the security view EPT 134b. In particular, the view management module 204 is configured to establish the guest-physical page to physical page mappings included in the EPTs 134a, 134b. The view management module 204 is also configured to manage the permissions associated with the guest-physical pages stored in the EPTs 134a, 134b. In some embodiments, the view management module 204 may be configured to install one or more inline hooks into the memory pages of an API function, as described below.

The access violation module 206 is configured to handle EPT violations that are generated from within the VMX non-root module 210. As described further below, EPT violations are generated when a memory access not allowed by the current EPT 134 is attempted from VMX non-root mode. Thus, EPT violations may correspond to hook-skipping attacks or other security violations. The access violation module 206 may perform any security operation in response to EPT violations, such as reporting violations, logging violations, or attempting to remediate violations. The access violation module 206 may include a VMExit handler 208 that is executed in response to EPT violations.

The VMX non-root module 210 is configured to execute in VMX non-root mode using the VMX support 122 of the processor 120. Thus, the VMX non-root module 210 may access the memory 130 through the guest page table 132. The VMX non-root module 210 may be embodied as a guest operating system (OS), a host OS executing in VMX non-root mode, or any other control structure of the computing device 100 that may execute in VMX non-root mode. The VMX non-root mode establishes an application 212, an API module 214, and a security module 218.

The application 212 may be embodied as any computer program executable by the computing device 100, including a native binary application, a managed bytecode application, an interpreted application, or a scripted application. The application 212 may be embodied as untrusted or user-provided code and thus may attempt malicious activities. The API module 214 may be embodied as any computer program or program library that may be executed by the computing device 100, including a dynamic link library (DLL), shared library, a bytecode archive, or a script library. The API module 214 includes an API function 216 that is exposed for use by the application 212. The API function 216 allows the application 212 to request services, software resources, hardware resources, or to perform any task provided by the API module 214. In many embodiments, the API function 216 may expose critical functionality, sensitive data, or other important features of the computing device 100. Thus, the API function 216 may be targeted by malware, such as a malicious application 212.

The security module 218 is configured to monitor calls to the API function 216 and prevent attacks by malicious software (such as a malicious application 212). In particular, the security module 218 is configured to execute a default inline hook 220 using the default memory view in response to a call to the API function 216 from the application 212. The security module 218 is further configured to switch to the security memory view using the FVS support 126 of the processor 120 and continue executing a security inline hook 222. The security module 218 is also configured to call a security callback 224 from the security inline hook 222, using the security memory view. The security callback 224 may be embodied as an anti-malware function or other security function that validates the call from the application 212 to the API function 216 and calls the API function 216 if validated. The security module 218 is further configured to switch back to the default memory view using the FVS support 126 of the processor 120 after completion of the security callback 224.

Although the environment 200 is illustrated as including a single application 212, API module 214, and API function 216, it should be understood that in some embodiments the computing device 100 may monitor multiple applications 212, API modules 214, and/or API functions 216. For example, an API module 214 may include several API functions 216, and corresponding inline hooks 220, 222 may be installed for each API function 216. Similarly, the computing device 100 may monitor several applications 212 that each access an API function 216 included in an API module 214, and so on.

Figure 3:
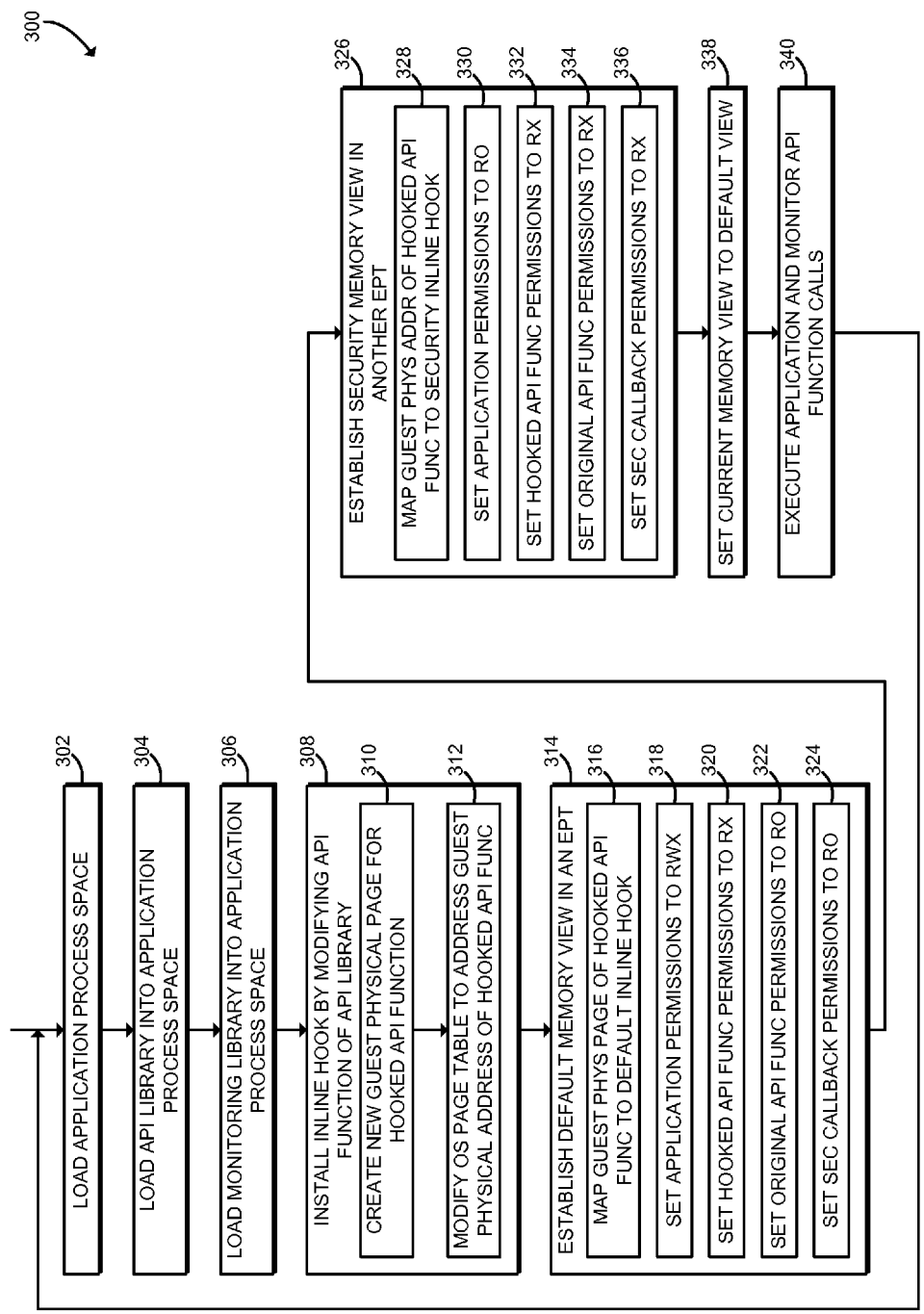
FIG. 3 is a simplified flow diagram of at least one embodiment of a method for initializing API function call monitoring that may be executed by the computing device of FIGS. 1 and 2.

Referring now to FIG. 3, in use, the computing device 100 may execute a method 300 for preparing to monitor calls to the API function 216. The method 300 may be executed in VMX-root mode, for example by a VMM, a hypervisor, or a host OS, and thus may have full access to the computing device 100, including the EPTs 134. The method 300 begins in block 302, in which the computing device 100 loads the process space for the application 212. The computing device 100 may load the application 212 into the memory 130 and prepare virtual page mappings for the application 212. In particular, because application 212 may be loaded in the VMX non-root mode, the computing device 100 may update the guest page table 132 with appropriate mappings between virtual memory pages used by the application 212 to guest-physical memory pages used by the VMX non-root mode, for example by a guest OS. Similarly, in block 304 the computing device 100 loads an API library including the API function 216 to be monitored into the process space of the application 212, and in block 306 the computing device 100 loads a monitoring library including the security callback 224 into the process space of the application 212. Both the API library and the monitoring library may be embodied as any dynamic link library (DLL), shared library, loadable module, static library, or other code module that may be executed by the computing device 100. The API library and/or the monitoring library may be statically or dynamically linked to the application 212, or may be injected into the application 212 at runtime.

Figure 4:
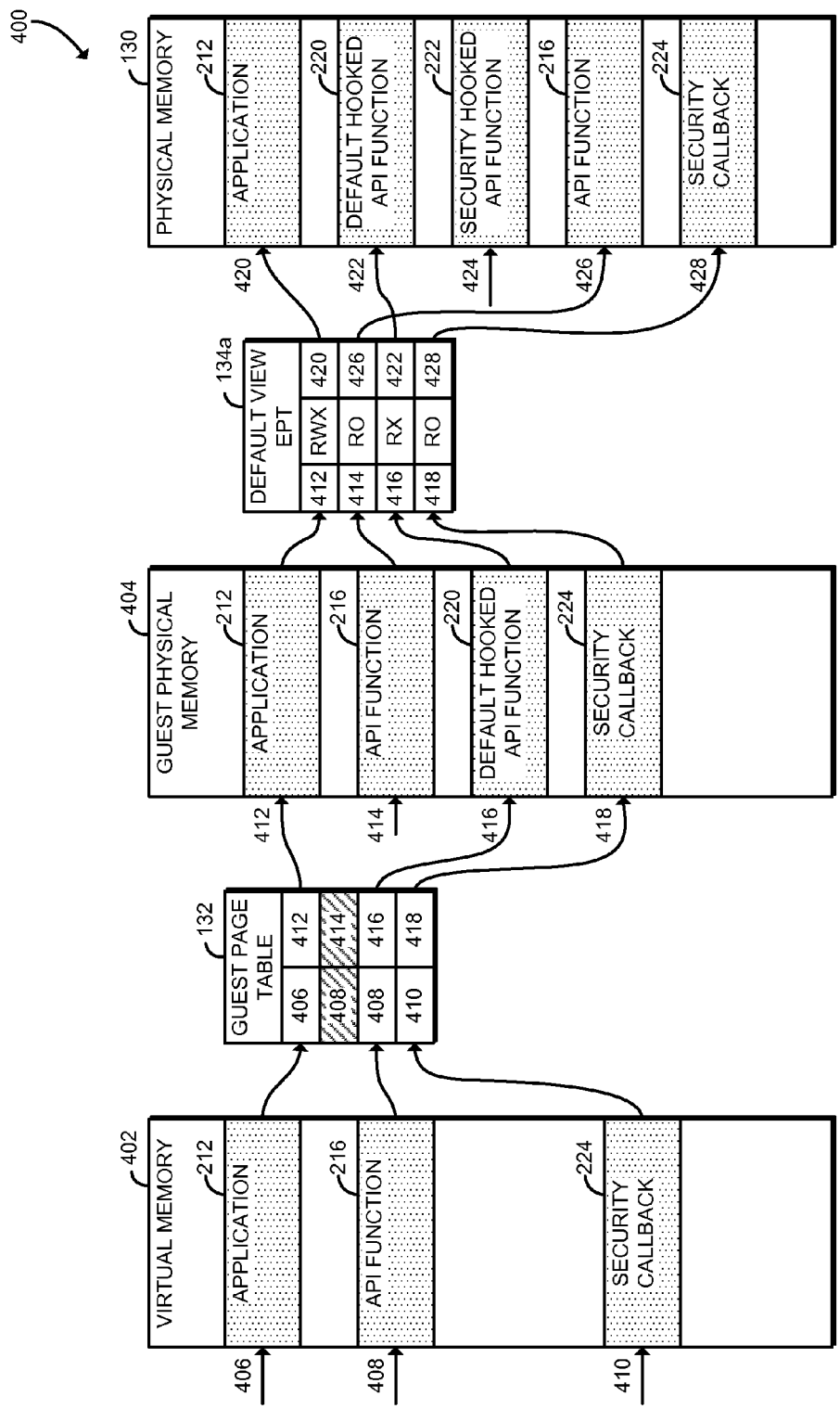
FIG. 4 is a schematic diagram of a default memory view that may be established by the method of FIG. 3.

Referring now to FIG. 4, the schematic diagram 400 illustrates one potential embodiment of the process space of the application 212 after loading the application, the API library, and the monitoring library. Block 402 illustrates the virtual memory layout of the process space of the application 212. As shown, the image of the application 212 itself is located at a virtual page 406, the API function 216 is located at a virtual page 408, and the security callback 224 is located at a virtual page 410. Block 404 illustrates the guest-physical memory layout of the process space of the application 212. As shown, the image of the application 212 is located at a guest-physical page 412, the API function 216 is located at a guest-physical page 414, and the security callback 224 is located at a guest physical page 418. The guest page table 132 maps between the virtual pages of the virtual memory 402 to the guest-physical pages of the guest physical memory 404. In the illustrative example, the guest page table 132 initially maps the virtual page 406 to the guest-physical page 412, the virtual page 408 to the guest-physical page 414, and the virtual page 410 to the guest-physical page 418.

Referring back to FIG. 3, in block 308 the computing device 100 installs an inline hook by modifying the API function 216. In some embodiments, the computing device 100 may install the default inline hook 220 or the security inline hook 222. The computing device 100 may use any technique to install the inline hook. For example, the computing device 100 may overwrite the first part of the API function 216 with the inline hook. In block 310, the computing device 100 may create a new guest physical page to include the hooked API function 216. The new guest-physical page may be created, for example, using a copy-on-write function of the guest OS of the computing device 100. In that example, the new guest physical page may be created in response to an attempt to modify memory page including the API function 216. After creating in the new guest physical page, in block 312 the computing device 100 may modify the guest page table 132 to address the guest physical page including the newly installed inline hook. Although described as being included in a single virtual and/or guest-physical page, it should be understood that the installed inline hook may encompass several pages.

Referring back to FIG. 4, the schematic diagram 400 also illustrates the process space of the application 212 after the default inline hook 220 has been installed. As shown, the default inline hook 220 is included in a guest physical page 416. The guest physical page 416 may be created, for example, by copying the guest physical page 414 and modifying the API function 216 to install the default inline hook 220. As illustrated, the guest page table 132 has been modified to change the mapping of the virtual page 408 from the guest physical page 414 to the guest physical page 416. Thus, after modifying the guest page table 132, any accesses from the application 212 to the virtual page 408—which originally mapped to the API function 216—are translated to the guest-physical page 416 containing the default inline hook 220.

Referring back to FIG. 3, in block 314 the computing device 100 establishes a default memory view using the EPT 134a, also known as the default view EPT 134a. The computing device 100 establishes the default memory view by setting the guest-physical page to physical page mappings of the default view EPT 134a and by setting appropriate permissions for the guest-physical pages. For the application 212, the API function 216, and the security callback 224, the computing device 100 may map guest-physical pages to the corresponding physical pages. In block 316, the computing device 100 maps the guest-physical page of the hooked API function 216 to the physical page including the default inline hook 220. As described above, the virtual page including the API function 216 may be mapped to a guest-physical page including a hooked copy of the API function 216. Thus, in the default view EPT 134a, that guest-physical page is mapped to the physical page in the memory 130 containing the default inline hook 220. In block 318, the computing device 100 may set the permissions of the guest-physical page including the application 212 to be readable, writeable, and executable. In block 320, the computing device 100 may set the permissions of the guest-physical page including the default inline hook 220 to be readable, not writeable, and executable. In block 322, the computing device 100 may set the permissions of the guest-physical page including the original API function 216 to be read-only; that is, readable, not writeable, and not executable. In block 324, the computing device 100 may set the permissions of the guest-physical page including the security callback 224 to be read-only; that is, readable, not writeable, and not executable.

Referring back to FIG. 4, the schematic diagram 400 further illustrates the default memory view provided by the default view EPT 134a. As shown, the memory 130 includes the application 212 located at a physical page 420, the default inline hook 220 located at a physical page 422, the API function 216 located at a physical page 426, and the security callback 224 located at a physical page 428. The memory 130 further includes the security inline hook 222 located at a physical page 424. The security inline hook 222 may be created by the computing device 100 in the physical memory 130, for example, by copying and modifying the physical page 426 that includes the original API function 216. The default view EPT 134a maps between the guest-physical pages of the guest-physical memory 404 to the physical pages of the memory 130. In the illustrative example, the default view EPT 134a maps the guest-physical page 412 to the physical page 420, the guest-physical page 414 to the physical page 426, the guest-physical page 416 to the physical page 422, and the guest-physical page 418 to the physical page 428. Therefore, a request from the application 212 to access the virtual page 408—which originally included the API function 216—may be translated to the guest-physical page 416 and then to the physical page 422 that includes the default inline hook 220. Note that the default view EPT 134a does not map any guest-physical page to the physical page 424. Thus, the physical page 424, including the security inline hook 222, may not be accessible to any software executed in the VMX non-root mode by the computing device 100.

Still referring to FIG. 4, as shown, the default view EPT 134a also includes permissions for each guest-physical page to physical page mapping. In the illustrative example, the guest-physical pages 414, 418 that include the API function 216 and the security callback 224, respectively, may not be modified or executed by software in VMX non-root mode. Additionally, the guest-physical page 416 that includes the default inline hook 220 may be executed but may not be modified by software in VMX non-root mode.

Referring back to FIG. 3, after setting up the default view EPT 134a, in block 326 the computing device 100 establishes a security memory view using the EPT 134b, also known as the security view EPT 134b. The computing device 100 establishes the security memory view by setting the guest-physical page to physical page mappings of the security view EPT 134b and by setting appropriate permissions for the guest physical pages. Similar to the default view EPT 134a, for the application 212, the API function 216, and the security callback 224, the computing device 100 may map guest physical pages to the corresponding physical pages. In block 328, the computing device 100 maps the guest physical page of the hooked API function 216 to the physical page including the security inline hook 222. As described above, the virtual page including the API function 216 may be mapped to a guest physical page including a hooked copy of the API function 216. Thus, in the security view EPT 134b, that guest-physical page is mapped to the physical page in the memory 130 containing the security inline hook 222. In block 330, the computing device 100 may set the permissions of the guest-physical page including the application 212 to be read-only; that is, readable, not writeable, and not executable. In block 332, the computing device 100 may set the permissions of the guest-physical page including the security inline hook 222 to be readable, not writeable, and executable. In block 334, the computing device 100 may set the permissions of the guest-physical page including the original API function 216 to be readable, not writeable, and executable. In block 336, the computing device 100 may set the permissions of the guest-physical page including the security callback 224 to be readable, not writeable, and executable.

Figure 5:
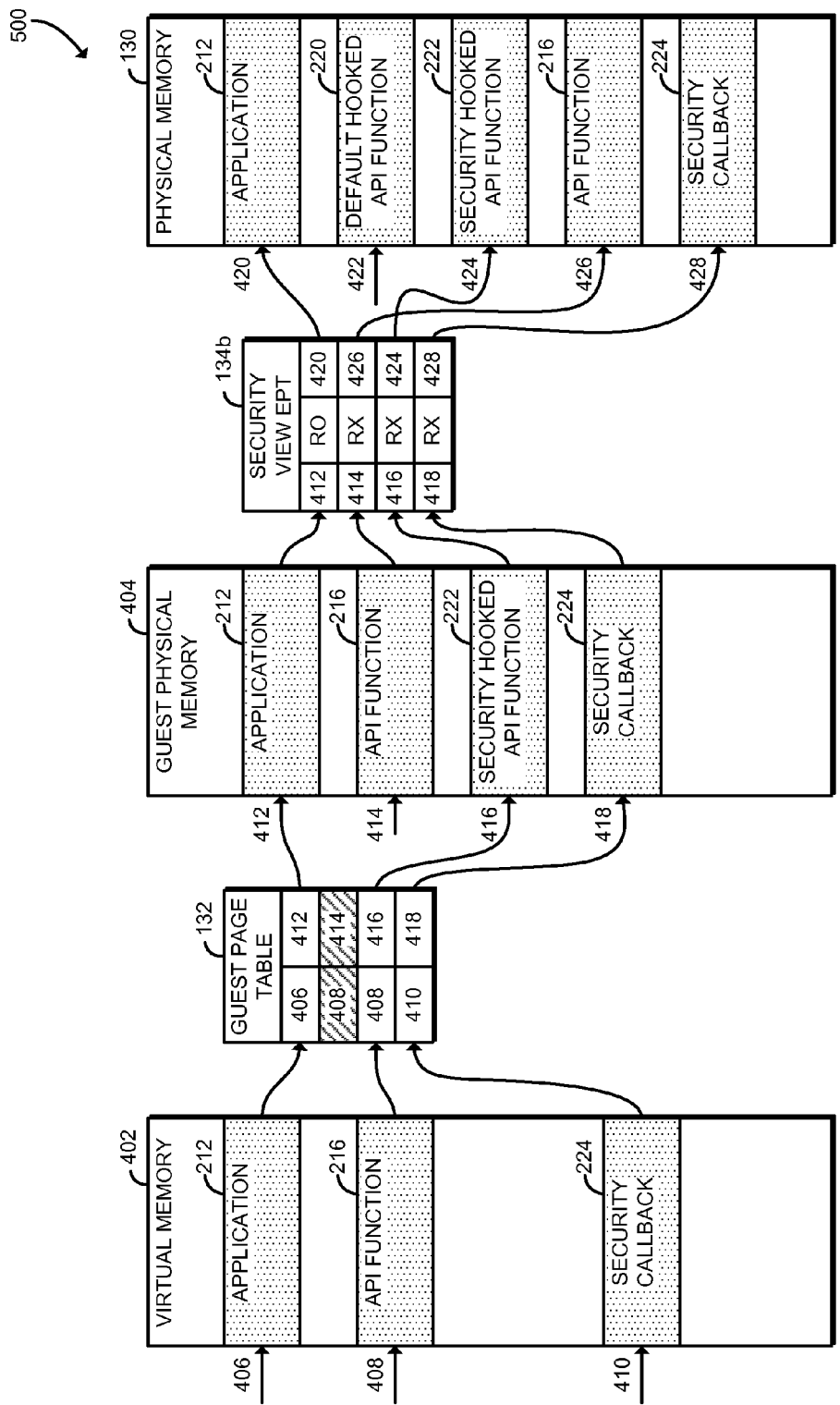
FIG. 5 is a schematic diagram of a security memory view that may be established by the method of FIG. 3.

Referring now to FIG. 5, the schematic diagram 500 illustrates the security memory view provided by the security view EPT 134b. As shown, the virtual memory 402, the guest physical memory 404, and the physical memory 130 are laid out similarly to the diagram 400 of FIG. 4. However, in contrast to the default memory view, in the security memory view, the security view EPT 134b maps between the guest-physical pages of the guest-physical memory 404 to the physical pages of the memory 130. In the illustrative example, the security view EPT 134b maps the guest-physical page 412 to the physical page 420, the guest-physical page 414 to the physical page 426, the guest-physical page 416 to the physical page 424, and the guest-physical page 418 to the physical page 428. Therefore, a request from the application 212 to access the virtual page 408—which originally included the API function 216—may be translated to the guest-physical page 416 and then to the physical page 424 that includes the security inline hook 222. Note that the security view EPT 134b does not map any guest-physical page to the physical page 422. Thus, the physical page 422, including the default inline hook 220, may not be accessible to any software executed in the VMX non-root mode by the computing device 100.

Still referring to FIG. 5, as shown, the security view EPT 134b also includes permissions for each guest-physical page to physical page mapping. In the illustrative example, the guest-physical page 420 that includes the application 212 may not be executed or modified by software in VMX non-root mode. Additionally, the guest-physical pages 414, 416, 418 that include the API function 216, the security inline hook 222, and the security callback 224, respectively, may be executed but may not be modified by software in the VMX non-root mode.

Referring back to FIG. 3, after establishing both the default memory view and the security memory view, in block 338 the computing device 100 sets the current memory view to the default memory view. To select the current memory view, the computing device 100 may use any technique to activate or otherwise select the default view EPT 134a. For example, the computing device 100 may set a pointer in a virtual machine control structure (VMCS) to point to the default view EPT 134a. In some embodiments, the computing device 100 may execute a specialized processor instruction such as VMFUNC to activate the default view EPT 134a.

In block 340, the computing device 100 executes the application 212 and monitors calls to the API function 216. The computing device executes the application 212 in the VMX non-root mode. Thus, all memory accesses of the application 212 may be made using the EPT support 124 of the processor 120. To monitor the calls to the API function 216, the computing device 100 may execute a method as described below in connection with FIG. 6. After executing the application 212, the method 300 loops back to block 302, in which the computing device 100 may continue monitoring calls to the API function 216.

Figure 6:
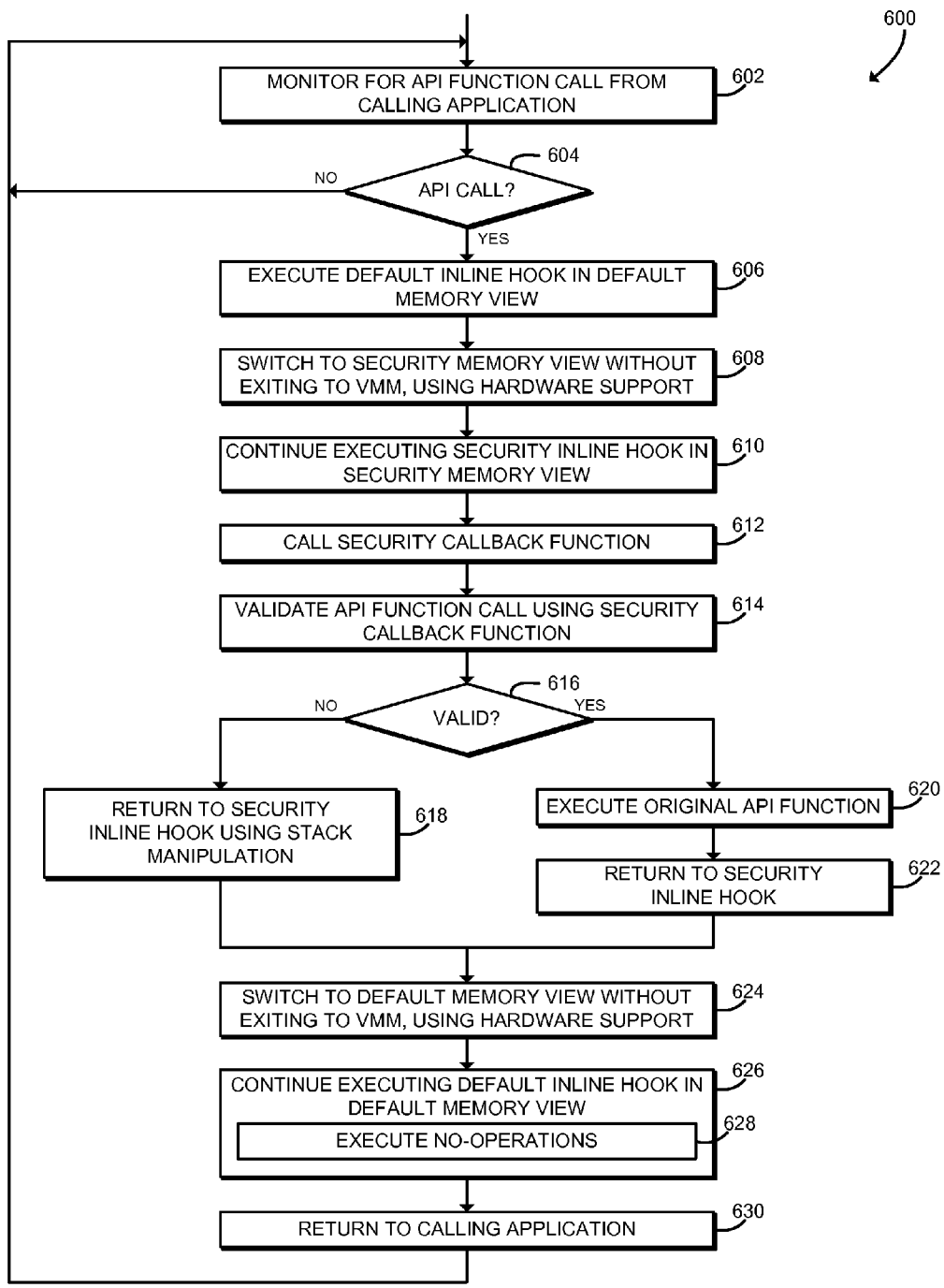
FIG. 6 is a simplified flow diagram of at least one embodiment of a method for monitoring API function calls that may be executed by the computing device of FIGS. 1 and 2.

Referring now to FIG. 6, in use, the computing device 100 may execute a method 600 for monitoring calls to the API function 216. The method 600 may be executed in the VMX non-root mode, for example by a guest OS or by the host OS, and thus may have limited access to the computing device 100, including limited access to the EPTs 134. The method 600 begins in block 602, in which the computing device 100 monitors for a call to the API function 216 from the application 212. The computing device 100 may use any technique for monitoring for a function call. For example, in some embodiments the computing device 100 may passively monitor for calls to the API function 216 by waiting for the application 212 to execute a call or jump instruction to the entry point of the API function 216. In other embodiments, the computing device 100 may actively monitor a virtual function or message dispatch system of the computing device 100. In block 604, the computing device determines whether a call to the API function 216 has been encountered. If not, the method 600 loops back to block 602 to continue monitoring for calls to the API function 216. If a call to the API function 216 has been encountered, the method 600 advances to block 606.

In block 606, the computing device 100 executes the default inline hook 220 using the default memory view. In other words, the computing device 100 executes code of the default inline hook 220 using the guest-physical page mappings and permissions specified by the default view EPT 134a. The computing device 100 may execute instructions of the default inline hook 220 that have been installed at the starting virtual memory location originally occupied by the API function 216.

In block 608, the computing device 100 switches to the security memory view using the FVS support 126 of the processor 120, without generating a VMExit. In other words, the computing device 100 switches to executing code using the guest-physical page mappings and permissions specified by the security view EPT 134b. As described above, the computing device 100 may switch to the security memory view using a specialized processor instruction such as VMFUNC. That processor instruction may be include in the default inline hook 220.

In block 610, after switching to the security memory view, the computing device 100 continues executing the security inline hook 222 in the security memory view. Because the computing device 100 switched to the security memory view during execution of the default inline hook 220, execution of the security inline hook 222 may proceed with a processor instruction located at the next virtual address. In other words, the virtual address of an instruction pointer register may be incremented as normal, but because the computing device 100 has switched to the security view EPT 134b, the physical memory page associated with that virtual address— and thus, the actual instruction executed for that virtual address—may change.

In block 612, the computing device 100 calls the security callback 224. Thus, the security callback 224 is executed using the security memory view. In block 614, the computing device 100 validates the call to the API function 216 using the security callback 224. In block 616, the computing device 100 determines whether the call to the API function 216 is valid. The security callback 224 may perform any validation, authentication, authorization, auditing, logging, or other security process to determine whether the call to the API function 216 is valid. For example, the computing device 100 may validate the identity of the calling application 212, evaluate arguments or other parameters used to call the API function 216, or perform other security operations. If the call to the API function 216 is valid, the method 600 branches to block 620, described below. If the call is invalid, the method 600 branches to block 618.

In block 618, the computing device 100 returns execution to the security inline hook 222. The computing device 100 does not call or otherwise execute the API function 216. The computing device 100 may return to the security inline hook 222 using stack manipulation or other technique to simulate a return from a function call. The computing device 100 may also report a security violation, terminate the application 212, attempt to clean the application 212, or perform any other security option in response to the call to the API function 216 being invalid (not shown). After returning to the security inline hook 222, the method 600 advances to block 624, described below.

Referring back to block 616, if the call to the API function 216 is valid, the method 600 branches to block 620, in which the computing device 100 executes the original API function 216. The computing device 100 may use any method to execute the API function 216, such as executing a processor instruction to call the API function 216. The API function 216 continues to execute in the security memory view. After completing execution of the API function 216, in block 622 the computing device 100 returns to the security inline hook 222. After returning to the security inline hook 222, the method 600 advances to block 624.

In block 624, the computing device 100 switches to the default memory view using the FVS support 126 of the processor 120, without generating a VMExit. In other words, the computing device 100 switches to executing code using the guest-physical page mappings and permissions specified by the default view EPT 134a. As described above, the computing device 100 may switch to the default memory view using a specialized processor instruction such as VMFUNC. That processor instruction may be include in the security inline hook 222.

In block 626, after switching to the default memory view, the computing device 100 continues executing the default inline hook 220 in the default memory view. Because the computing device 100 switched to the default memory view during execution of the security inline hook 222, execution of the default inline hook 220 may proceed with a processor instruction located at the next virtual address. In other words, the virtual address of the instruction pointer register may be incremented as normal, but because the computing device 100 has switched to the default view EPT 134a, the physical memory page associated with that virtual address— and thus, the actual instruction executed for that virtual address—may change. In block 628, the computing device 100 may execute one or more NOP instructions in the default inline hook 220. In some embodiments, the default inline hook 220 may be padded with NOP instructions in order to match the in-memory size or layout of the API function 216. In block 630, the computing device 100 returns to the calling application 212. The computing device 100, for example, may execute a return instruction used to return from a subroutine call. After returning to the application 212, the method 600 loops back to block 602 to continue monitoring for calls to the API function 216.

Figure 7:
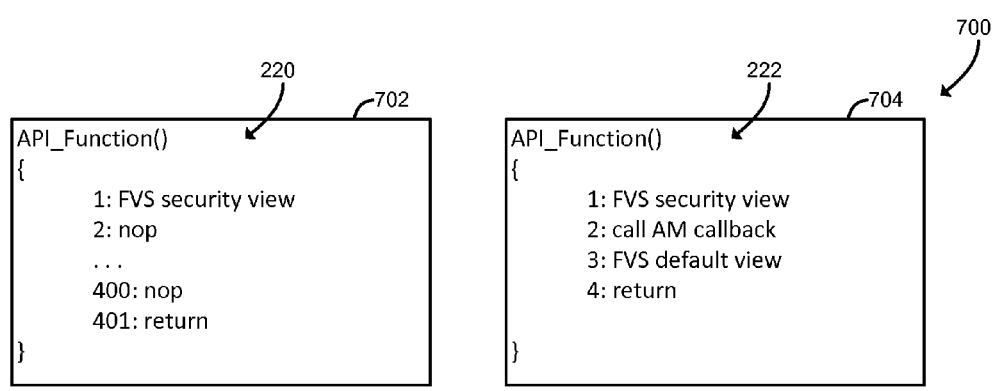
FIG. 7 is a diagram illustrating pseudocode for at least one embodiment of a default inline hook and a security inline hook that may be executed by the method of FIG. 6.

Referring now to FIG. 7, the diagram 700 illustrates pseudocode for one potential embodiment of the default inline hook 220 and the security inline hook 222. Pseudocode 702 illustrates one possible embodiment of the default inline hook 220. As shown, the default inline hook 220 may include instruction 1 to perform a fast view switch to the security memory view, followed NOP instructions 2 through 400, and finished with instruction 401 to return to the calling application 212. In some embodiments, the default inline hook 220 may also include an instruction such as VMCALL to trigger a VMExit or otherwise call a hypervisor in order to signal a potential attack scenario. As described above, the default inline hook 220 may be padded with NOP instructions 400 to be the same size or layout as the API function 216. Pseudocode 704 illustrates one embodiment of the security inline hook 222. As shown, the security inline hook 222 may include instruction 1 to switch to the security memory view, instruction 2 to call the security callback 224, instruction 3 to switch back to the default memory view, and instruction 4 to return.

In use, the processor 120 begins execution of the default inline hook 220 with the instruction 1, which switches the processor 120 to the security memory view. After execution of the instruction 1, the processor 120 proceeds to execute the instruction 2. However, because the processor 120 has switched to the security view EPT 134b, the processor 120 executes the instruction 2 from the security inline hook 222, not from the default inline hook 220. Thus, the processor 120 executes the instruction 2, which calls the security callback 224. As described above, the security callback 224 performs security operations and may call the original API function 216. After the security callback 224 returns to the security inline hook 222, the processor 120 executes the instruction 3, which causes the processor to switch back to the default memory view. After execution of the instruction 3, the processor 120 proceeds to execute the instruction 4. Because the processor 120 has switched to the default view EPT 134a, the processor 120 executes the instruction 4 from the default inline hook 220, which is a NOP instruction. As shown, the processor 120 continues to execute NOP instructions within the default inline hook 220 until executing the instruction 401, which returns to the application 212. Additionally or alternatively, in some embodiments, the processor may execute a VMCALL instruction (not shown) to signal an attack to the hypervisor.

Figure 8:
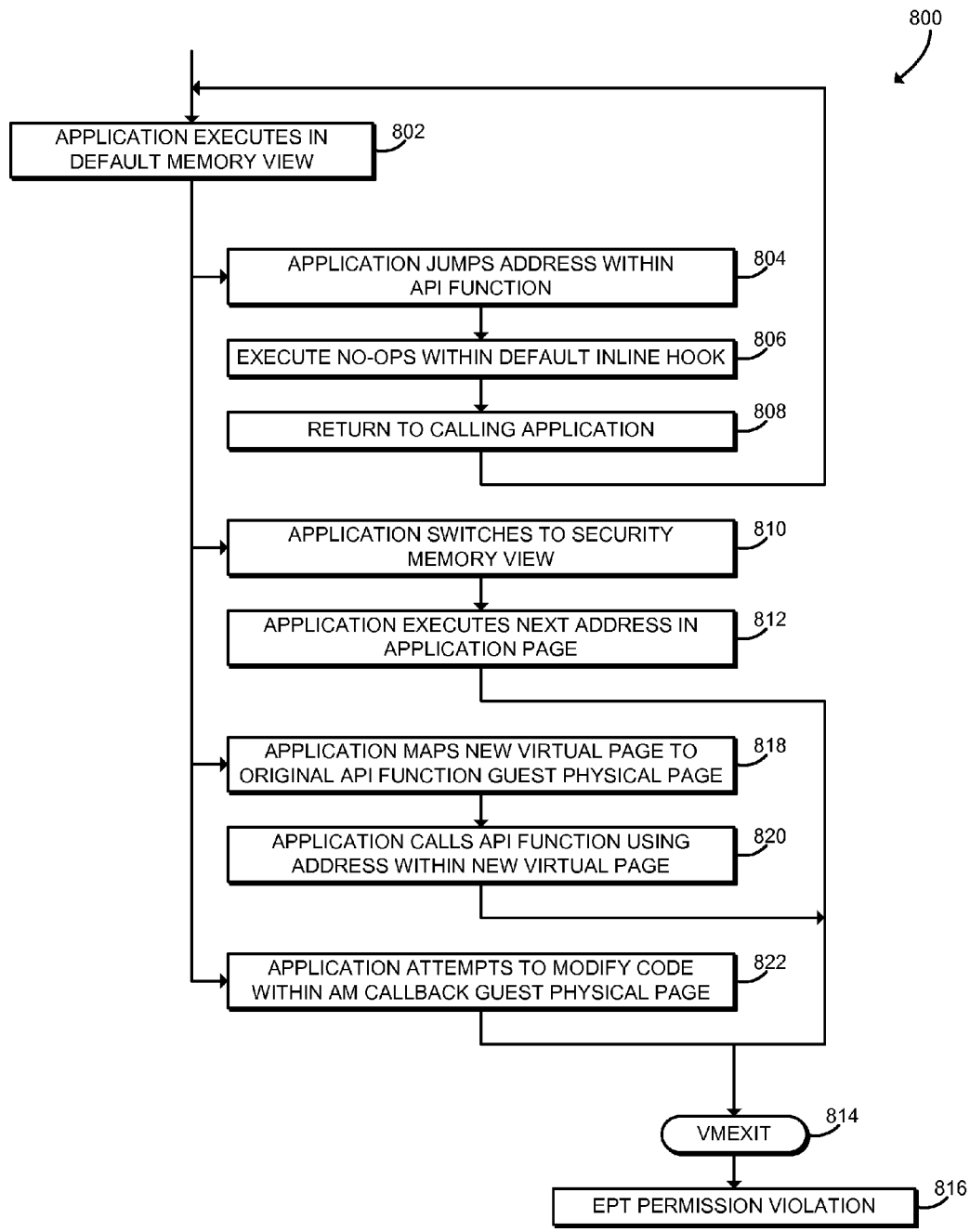
FIG. 8 is a simplified flow diagram of at least one embodiment of a method for preventing or handling hook-skipping attacks that may be executed by the computing device of FIGS. 1 and 2.

Referring now to FIG. 8, in use, the computing device 100 may execute a method 800 for preventing or handling hook-skipping attacks. The method 800 may be executed in the VMX non-root mode, for example by a guest OS or by the host OS, and thus may have limited access to the computing device 100, including limited access to the EPTs 134. The method 800 begins in block 802, in which the computing device 100 executes the application 212 in the default memory view. In other words, the computing device 100 executes the application 212 in VMX non-root mode, using the default view EPT 134a. In some embodiments, the application 212 may include untrusted, arbitrary code selected for execution by a user of the computing device 100. Thus, the application 212 may, intentionally or inadvertently, attempt malicious activity. In particular, the application 212 may include malicious code that attempts to skip the inline hooks 220, 222 and execute the API function 216 directly. Depending on the particular hook-skipping attack attempted, execution of the method 800 may proceed to any of blocks 804, 810, 818, 822, described below.

As one example of a hook-skipping attack, in block 804, the computing device 100 jumps to an address within the API function 216, beyond the entry point of the API function 216. For example, a malicious application 212 may jump to an address that is a few instructions beyond the beginning of the API function 216 in an attempt to skip over any inline hooks installed in the API function 216. In block 806, the computing device 100 executes one or more no-operation instructions from within the default inline hook 220 in response to jumping to the address within the API function 216. In block 808, the computing device 100 returns to the calling application 212. The method 800 loops back to block 802 to continue executing the application 212 in the default memory view. Thus, the API function 216 may not be executed in response to the jump to the address within the API function 216.

To illustrate how this hook-skipping attack is handled, refer to the diagram 400 of FIG. 4, which illustrates the default memory view. As shown, the application 212 may access the API function 216 through the virtual page 408. Thus, a malicious application 212 may jump to an internal address within the API function 216 by jumping to an address within the virtual page 408. As shown, the guest page table 132 and the default view EPT 134a map the virtual page 408 to the guest-physical page 416 and the physical page 422, respectively. Thus, a jump by the application 212 to an internal location within the API function 216 (in the virtual page 408) is mapped to a jump to a location within the default inline hook 220 (in the physical page 422). As shown by the pseudocode 702 of FIG. 7, instruction 1 is the only valid entry point of the default inline hook 220; the rest of the instructions of the default inline hook 220 are NOPs followed by a return instruction. Therefore, if the application 212 jumps into the interior of the default inline hook 220 (e.g., jumps to instruction 2), the computing device 100 merely executes a series of NOPs before returning to the application 212.

Referring back to FIG. 8, as another example of a hook-skipping attack, in block 810 the computing device 100 may switch to the security memory view from within the application 212. For example, a malicious application 212 may execute a processor instruction such as VMFUNC to switch to the security memory view. The processor 120 may successfully switch to the security memory view. In block 812, the computing device 100 attempts to execute the next instruction from the application 212. In a hook-skipping attack, the next instruction may typically attempt to call the API function 216 directly without monitoring by the security callback 224. However, as described above, the security view EPT 134b defines the guest-physical page including the application 212 to be read-only and not executable. For example, referring to FIG. 5, the security view EPT 134b marks the guest-physical page 412 that is mapped to the physical page 420 that includes the application 212 as read-only and not executable. Thus, the attempt to execute the next instruction in the application 212 generates an EPT violation, and execution of the method 800 branches ahead to block 814.

In block 814, the computing device 100 generates a VMExit in response to the EPT violation. As described above, the VMExit causes the computing device 100 to switch context to the VMX-root mode. The computing device 100 may call a VMExit handler 208 in response to the VMExit. In block 816, the computing device 100 handles the EPT violation in VMX-root mode. For example, the EPT violation may be handled by the VMM, hypervisor, or host OS of the computing device 100. To handle the EPT violation, the computing device 100 may, for example, terminate the application 212, report a security violation, log a security violation, initiate a malware scan, or perform any other appropriate security operation. After handling the EPT violation, the method 800 may be completed. Although illustrated as generating a VMExit that may be handled by the VMM, it should be understood that in some embodiments, the permissions violation may generate a virtualization exception that is handled by a guest OS or the host OS.

Referring now to block 818, in another example of a hook-skipping attack, the computing device 100 may map a new virtual page to the guest-physical page that includes the original API function 216. For example, referring again to FIG. 4, a malicious application 212 may create a new virtual page in the virtual memory 402 that is mapped to the guest-physical page 414 in the guest-physical memory 404. The application 212 may accomplish this by manipulating the guest page table 132 or using any other technique. In block 820, the computing device 100 calls the API function 216 using an address within the newly mapped virtual page. As described above, that virtual address is translated, using the guest OS page table 132, into a guest-physical address for the API function 216. Because the default memory view is active, the guest-physical page that includes the original API function 216 is marked as read-only and not executable. For example, referring again to FIG. 4, the original API function is included in the guest-physical page 414, which is marked in the default view EPT 134a to be read-only. Therefore, the attempt to call the API function 216 generates an EPT violation, and execution of the method 800 branches ahead to block 814, as described above.

Referring now to block 822, in another example of a hook-skipping attack, the computing device 100 may attempt to modify code within the security callback 224. For example, a malicious application 212 may attempt to modify the security callback 224 to alter or avoid security checks. However, the default view EPT 134a marks the guest-physical page including the security callback 224 as read-only, and the security view EPT 134b marks the guest-physical page including the security callback 224 as readable and executable but not writable. For example, as shown in FIG. 4, the guest-physical page 418 is marked by the default view EPT 134a to be read-only, and as shown in FIG. 5 the guest-physical page 418 is marked by the security view EPT 134b to be read-execute-only. Therefore, the attempt to modify the security callback 224 generates an EPT violation, and execution of the method 800 branches ahead to block 814, as described above.

EXAMPLES

Illustrative examples of the technologies disclosed herein are provided below. An embodiment of the technologies may include any one or more, and any combination of, the examples described below.

Example 1 includes a computing device for monitoring an application programming interface (API), the computing device comprising a view management module to: (i) establish a default memory view, wherein the default memory view defines a first physical memory map of the computing device and a first set of memory permissions and (ii) establish a security memory view, wherein the security memory view defines a second physical memory map of the computing device and a second set of memory permissions; and a security module to execute a default inline hook with the default memory view in response to a call of an API function from an application; switch to the security memory view without a virtual machine exit event in response to execution of the default inline hook; execute a security inline hook with the security memory view in response to a switch to the security memory view; and call an anti-malware callback function in response to execution of the security inline hook.

Example 2 includes the subject matter of Example 1, and wherein the security module is further to switch to the default memory view without a virtual machine exit event in response to a call of the anti-malware callback function; and return to the application in response to a switch to the default memory view.

Example 3 includes the subject matter of any of Examples 1 and 2, and wherein the anti-malware callback function is to call the API function in response to a validation of the call of the API function from the application.

Example 4 includes the subject matter of any of Examples 1-3, and wherein the anti-malware callback function is further to return to the security inline hook without a call of the API function in response to a failure to validate the call of the API function from the application.

Example 5 includes the subject matter of any of Examples 1-4, and wherein the first physical memory map of the default memory view maps a guest physical memory page that includes the API function to a first physical page that includes the default inline hook; and the second physical memory map of the security memory view maps the guest physical memory page that includes the API function to a second physical page that includes the security inline hook.

Example 6 includes the subject matter of any of Examples 1-5, and wherein the first set of memory permissions of the default memory view comprises a read permission, a write permission, and an execute permission for a first guest physical memory page that includes the application; a read permission and an execute permission for a second guest physical memory page that includes the default inline hook; a read permission for a third guest physical memory page that includes the API function; and a read permission for a fourth guest physical memory page that includes the anti-malware callback function.

Example 7 includes the subject matter of any of Examples 1-6, and wherein the second set of memory permissions of the security memory view comprises a read permission for the first guest physical memory page that includes the application; a read permission and an execute permission for the second guest physical memory page that includes the security inline hook; a read permission and an execute permission for the third guest physical memory page that includes the API function; and a read permission and an execute permission for the fourth guest physical memory page that includes the anti-malware callback function.

Example 8 includes the subject matter of any of Examples 1-7, and wherein to establish the default memory view comprises to define the default memory view with one or more extended page tables of the computing device; and to establish the security memory view comprises to define the security memory view with one or more extended page tables of the computing device.

Example 9 includes the subject matter of any of Examples 1-8, and wherein to switch to the security memory view comprises to execute a first processor instruction to switch to the security memory view.

Example 10 includes the subject matter of any of Examples 1-9, and wherein the first processor instruction comprises a processor instruction to change an extended page table pointer of the computing device.

Example 11 includes the subject matter of any of Examples 1-10, and wherein the default inline hook comprises a first processor instruction located at a first guest physical address, the first processor instruction to switch to the security memory view; the security inline hook comprises a second processor instruction located at a second guest physical address located immediately adjacent to the first guest physical address, the second processor instruction to call the anti-malware callback function; and the security module is further to (i) execute the first processor instruction and (ii) execute the second processor instruction immediately after execution of the first processor instruction.

Example 12 includes the subject matter of any of Examples 1-11, and wherein the security inline hook further comprises a third processor instruction located at a third guest physical address, the third processor instruction to switch to the default memory view; the default inline hook further comprises a fourth processor instruction located at a fourth guest physical address located immediately adjacent to the third guest physical address; the security module is further to (i) execute the third processor instruction and (ii) execute the fourth processor instruction immediately after execution of the third processor instruction and in response to a switch to the default memory view.

Example 13 includes the subject matter of any of Examples 1-12, and wherein the fourth processor instruction comprises a no-operation instruction.

Example 14 includes the subject matter of any of Examples 1-13, and wherein the view management module is further to modify, prior to the execution of the default inline hook, a guest physical page that includes the API function to install the default inline hook.

Example 15 includes a method for monitoring an application programming interface (API), the method comprising executing, by a computing device, a default inline hook using a default memory view in response to an application calling an API function, wherein the default memory view defines a first physical memory map of the computing device and a first set of memory permissions; switching, by the computing device, to a security memory view without causing a virtual machine exit event in response to executing the default inline hook, wherein the security memory view defines a second physical memory map of the computing device and a second set of memory permissions; executing, by the computing device, a security inline hook using the security memory view in response to switching to the security memory view; and calling, by the computing device, an anti-malware callback function in response to executing the security inline hook.

Example 16 includes the subject matter of Examples 15, and further comprising switching, by the computing device, to the default memory view without causing a virtual machine exit event in response to calling the anti-malware callback function; and returning, by the computing device, to the application in response to switching to the default memory view.

Example 17 includes the subject matter of any of Examples 15 and 16, and wherein the anti-malware callback function is to call the API function in response to validating the application calling the API function.

Example 18 includes the subject matter of any of Examples 15-17, and wherein the anti-malware callback function is to return to the security inline hook without calling the API function in response to failing to validate the application calling the API function.

Example 19 includes the subject matter of any of Examples 15-18, and further comprising defining, by the computing device, the first physical memory map of the default memory view to map a guest physical memory page including the API function to a first physical page including the default inline hook; and defining, by the computing device, the second physical memory map of the security memory view to map the guest physical memory page including the API function to a second physical page including the security inline hook.

Example 20 includes the subject matter of any of Examples 15-19, and further comprising defining, by the computing device, the first set of memory permissions of the default memory view to allow a first guest physical memory page including the application to be readable, writable, and executable; a second guest physical memory page including the default inline hook to be readable, not writeable, and executable; a third guest physical memory page including the API function to be readable, not writeable, and not executable; and a fourth guest physical memory page including the anti-malware callback function to be readable, not writeable, and not executable.

Example 21 includes the subject matter of any of Examples 15-20, and further comprising defining, by the computing device, the second set of memory permissions of the security memory view to allow the first guest physical memory page including the application to be readable, not writable, and not executable; the second guest physical memory page including the security inline hook to be readable, not writeable, and executable; the third guest physical memory page including the API function to be readable, not writeable, and executable; and the fourth guest physical memory page including the anti-malware callback function to be readable, not writeable, and executable.

Example 22 includes the subject matter of any of Examples 15-21, and further comprising defining, by the computing device, the default memory view using one or more extended page tables of the computing device; and defining, by the computing device, the security memory view using one or more extended page tables of the computing device.

Example 23 includes the subject matter of any of Examples 15-22, and wherein switching to the security memory view comprises executing a first processor instruction to switch to the security memory view.

Example 24 includes the subject matter of any of Examples 15-23, and wherein executing the first processor instruction comprises executing a processor instruction to change an extended page table pointer of the computing device.

Example 25 includes the subject matter of any of Examples 15-24, and wherein switching to the security memory view comprises executing a first processor instruction, wherein the first processor instruction is located within the default inline hook at a first guest physical address; and calling the anti-malware callback function comprises executing a second processor instruction immediately after executing the first processor instruction, wherein the second processor instruction is located within the security inline hook at a second guest physical address located immediately adjacent to the first guest physical address.

Example 26 includes the subject matter of any of Examples 15-25, and further comprising switching, by the computing device, to the default memory view without causing a virtual machine exit event in response to calling the anti-malware callback function, wherein switching to the default memory view comprises executing a third processor instruction, wherein the third processor instruction is located within the security inline hook at a third guest physical address; and executing, by the computing device, a fourth processor instruction immediately after executing the third processor instruction and in response to switching to the default memory view, wherein the fourth processor instruction is located within the default inline hook at a fourth guest physical address located immediately adjacent to the third guest physical address.

Example 27 includes the subject matter of any of Examples 15-26, and wherein the fourth processor instruction comprises a no-operation instruction.

Example 28 includes the subject matter of any of Examples 15-27, and further comprising modifying, by the computing device prior to executing the default inline hook, a guest physical page including the API function to install the default inline hook.

Example 29 includes a computing device comprising a processor; and a memory having stored therein a plurality of instructions that when executed by the processor cause the computing device to perform the method of any of Examples 15-28.

Example 30 includes one or more machine readable storage media comprising a plurality of instructions stored thereon that in response to being executed result in a computing device performing the method of any of Examples 15-28.

Example 31 includes a computing device comprising means for performing the method of any of Examples 15-28.

Example 32 includes a computing device for monitoring an application programming interface (API), the computing device comprising means for executing a default inline hook using a default memory view in response to an application calling an API function, wherein the default memory view defines a first physical memory map of the computing device and a first set of memory permissions; means for switching to a security memory view without causing a virtual machine exit event in response to executing the default inline hook, wherein the security memory view defines a second physical memory map of the computing device and a second set of memory permissions; means for executing a security inline hook using the security memory view in response to switching to the security memory view; and means for calling an anti-malware callback function in response to executing the security inline hook.

Example 33 includes the subject matter of Example 32, and further comprising means for switching to the default memory view without causing a virtual machine exit event in response to calling the anti-malware callback function; and means for returning to the application in response to switching to the default memory view.

Example 34 includes the subject matter of any of Examples 32 and 33, and wherein the anti-malware callback function is to call the API function in response to validating the application calling the API function.

Example 35 includes the subject matter of any of Examples 32-34, and wherein the anti-malware callback function is to return to the security inline hook without calling the API function in response to failing to validate the application calling the API function.

Example 36 includes the subject matter of any of Examples 32-35, and further comprising means for defining the first physical memory map of the default memory view to map a guest physical memory page including the API function to a first physical page including the default inline hook; and means for defining the second physical memory map of the security memory view to map the guest physical memory page including the API function to a second physical page including the security inline hook.

Example 37 includes the subject matter of any of Examples 32-36, and further comprising means for defining the first set of memory permissions of the default memory view to allow a first guest physical memory page including the application to be readable, writable, and executable; a second guest physical memory page including the default inline hook to be readable, not writeable, and executable; a third guest physical memory page including the API function to be readable, not writeable, and not executable; and a fourth guest physical memory page including the anti-malware callback function to be readable, not writeable, and not executable.

Example 38 includes the subject matter of any of Examples 32-37, and further comprising means for defining the second set of memory permissions of the security memory view to allow the first guest physical memory page including the application to be readable, not writable, and not executable; the second guest physical memory page including the security inline hook to be readable, not writeable, and executable; the third guest physical memory page including the API function to be readable, not writeable, and executable; and the fourth guest physical memory page including the anti-malware callback function to be readable, not writeable, and executable.

Example 39 includes the subject matter of any of Examples 32-38, and further comprising means for defining the default memory view using one or more extended page tables of the computing device; and means for defining the security memory view using one or more extended page tables of the computing device.

Example 40 includes the subject matter of any of Examples 32-39, and wherein the means for switching to the security memory view comprises means for executing a first processor instruction to switch to the security memory view.

Example 41 includes the subject matter of any of Examples 32-40, and wherein the means for executing the first processor instruction comprises means for executing a processor instruction to change an extended page table pointer of the computing device.

Example 42 includes the subject matter of any of Examples 32-41, and wherein the means for switching to the security memory view comprises means for executing a first processor instruction, wherein the first processor instruction is located within the default inline hook at a first guest physical address; and the means for calling the anti-malware callback function comprises means for executing a second processor instruction immediately after executing the first processor instruction, wherein the second processor instruction is located within the security inline hook at a second guest physical address located immediately adjacent to the first guest physical address.

Example 43 includes the subject matter of any of Examples 32-42, and further comprising means for switching to the default memory view without causing a virtual machine exit event in response to calling the anti-malware callback function, wherein switching to the default memory view comprises executing a third processor instruction, wherein the third processor instruction is located within the security inline hook at a third guest physical address; and means for executing a fourth processor instruction immediately after executing the third processor instruction and in response to switching to the default memory view, wherein the fourth processor instruction is located within the default inline hook at a fourth guest physical address located immediately adjacent to the third guest physical address.

Example 44 includes the subject matter of any of Examples 32-43, and wherein the fourth processor instruction comprises a no-operation instruction.

Example 45 includes the subject matter of any of Examples 32-44, and further comprising means for modifying, prior to executing the default inline hook, a guest physical page including the API function to install the default inline hook.

The invention claimed is:

1. A computing device for monitoring an application programming interface (API), the computing device comprising:
   a view management module to: (i) establish a default memory view, wherein the default memory view defines a first physical memory map of the computing device and a first set of memory permissions and (ii) establish a security memory view, wherein the security memory view defines a second physical memory map of the computing device and a second set of memory permissions; and a security module to:
   execute a default inline hook with the default memory view in response to a call of an API function from an application;
   switch to the security memory view without a virtual machine exit event in response to execution of the default inline hook;
   execute a security inline hook with the security memory view in response to a switch to the security memory view; and
   call an anti-malware callback function in response to execution of the security inline hook, wherein the anti-malware callback function is to call the API function in response to a validation of the call of the API function from the application, and wherein the anti-malware callback function is further to return to the security inline hook without a call of the API function in response to a failure to validate the call of the API function from the application.

2. The computing device of claim 1, wherein:
the first physical memory map of the default memory view maps a guest physical memory page that includes the API function to a first physical page that includes the default inline hook; and
the second physical memory map of the security memory view maps the guest physical memory page that includes the API function to a second physical page that includes the security inline hook.

3. The computing device of claim 1, wherein the first set of memory permissions of the default memory view comprises:
   a read permission, a write permission, and an execute permission for a first guest physical memory page that includes the application;
   a read permission and an execute permission for a second guest physical memory page that includes the default inline hook;
   a read permission for a third guest physical memory page that includes the API function; and
   a read permission for a fourth guest physical memory page that includes the anti-malware callback function.

4. The computing device of claim 3, wherein the second set of memory permissions of the security memory view comprises:
   a read permission for the first guest physical memory page that includes the application;
   a read permission and an execute permission for the second guest physical memory page that includes the security inline hook;
   a read permission and an execute permission for the third guest physical memory page that includes the API function; and
   a read permission and an execute permission for the fourth guest physical memory page that includes the anti-malware callback function.

5. The computing device of claim 1, wherein:
to establish the default memory view comprises to define the default memory view with one or more extended page tables of the computing device; and
to establish the security memory view comprises to define the security memory view with one or more extended page tables of the computing device.

6. The computing device of claim 1, wherein to switch to the security memory view comprises to execute a first processor instruction to switch to the security memory view.

7. The computing device of claim 6, wherein the first processor instruction comprises a processor instruction to change an extended page table pointer of the computing device.

8. The computing device of claim 1, wherein:
the default inline hook comprises a first processor instruction located at a first guest physical address, the first processor instruction to switch to the security memory view;
the security inline hook comprises a second processor instruction located at a second guest physical address located immediately adjacent to the first guest physical address, the second processor instruction to call the anti-malware callback function; and
the security module is further to (i) execute the first processor instruction and (ii) execute the second processor instruction immediately after execution of the first processor instruction.

9. The computing device of claim 8, wherein:
the security inline hook further comprises a third processor instruction located at a third guest physical address, the third processor instruction to switch to the default memory view;
the default inline hook further comprises a fourth processor instruction located at a fourth guest physical address located immediately adjacent to the third guest physical address;
the security module is further to (i) execute the third processor instruction and (ii) execute the fourth processor instruction immediately after execution of the third processor instruction and in response to a switch to the default memory view.

10. The computing device of claim 9, wherein the fourth processor instruction comprises a no-operation instruction.

11. A method for monitoring an application programming interface (API), the method comprising:
   executing, by a computing device, a default inline hook using a default memory view in response to an application calling an API function, wherein the default memory view defines a first physical memory map of the computing device and a first set of memory permissions;
   switching, by the computing device, to a security memory view without causing a virtual machine exit event in response to executing the default inline hook, wherein the security memory view defines a second physical memory map of the computing device and a second set of memory permissions;
   executing, by the computing device, a security inline hook using the security memory view in response to switching to the security memory view; and
   calling, by the computing device, an anti-malware callback function in response to executing the security inline hook, wherein the anti-malware callback function is to call the API function in response to validating the application calling the API function, and wherein the anti-malware callback function is to return to the security inline hook without calling the API function in response to failing to validate the application calling the API function.

12. The method of claim 11, further comprising:
defining, by the computing device, the default memory view using one or more extended page tables of the computing device; and
defining, by the computing device, the security memory view using one or more extended page tables of the computing device.

13. The method of claim 11, wherein switching to the security memory view comprises executing a first processor instruction to switch to the security memory view.

14. The method of claim 13, wherein executing the first processor instruction comprises executing a processor instruction to change an extended page table pointer of the computing device.

15. One or more non-transitory computer-readable storage media comprising a plurality of instructions that in response to being executed cause a computing device to:
execute a default inline hook using a default memory view in response to an application calling an API function, wherein the default memory view defines a first physical memory map of the computing device and a first set of memory permissions;
switch to a security memory view without causing a virtual machine exit event in response to executing the default inline hook, wherein the security memory view defines a second physical memory map of the computing device and a second set of memory permissions;
execute a security inline hook using the security memory view in response to switching to the security memory view; and
call an anti-malware callback function in response to executing the security inline hook, wherein the anti-malware callback function is to call the API function in response to validating the application calling the API function, and wherein the anti-malware callback function is to return to the security inline hook without calling the API function in response to failing to validate the application calling the API function.

16. The one or more non-transitory computer-readable storage media of claim 15, further comprising a plurality of instructions that in response to being executed cause the computing device to:
define the default memory view using one or more extended page tables of the computing device; and
define the security memory view using one or more extended page tables of the computing device.

17. The one or more non-transitory computer-readable storage media of claim 15, wherein to switch to the security memory view comprises to execute a first processor instruction to switch to the security memory view.

18. The one or more non-transitory computer-readable storage media of claim 17, wherein to execute the first processor instruction comprises to execute a processor instruction to change an extended page table pointer of the computing device.

19. The one or more non-transitory computer-readable storage media of claim 15, wherein:
to switch to the security memory view comprises to execute a first processor instruction, wherein the first processor instruction is located within the default inline hook at a first guest physical address; and
to call the anti-malware callback function comprises to execute a second processor instruction immediately after executing the first processor instruction, wherein the second processor instruction is located within the security inline hook at a second guest physical address located immediately adjacent to the first guest physical address.

20. The one or more non-transitory computer-readable storage media of claim 19, further comprising a plurality of instructions that in response to being executed cause the computing device to:
switch to the default memory view without causing a virtual machine exit event in response to calling the anti-malware callback function, wherein switching to the default memory view comprises executing a third processor instruction, wherein the third processor instruction is located within the security inline hook at a third guest physical address; and
execute a fourth processor instruction immediately after executing the third processor instruction and in response to switching to the default memory view, wherein the fourth processor instruction is located within the default inline hook at a fourth guest physical address located immediately adjacent to the third guest physical address.

* * * * *